United States Patent
Dick (10) Patent No.: US 8,967,676 B1
(45) Date of Patent: Mar. 3, 2015

(54) TWO-PIECE SPLIT COUPLER FOR COUPLING LARGE-DIAMETER PLASTIC CORRUGATED PIPE

(71) Applicant: Lane Enterprises, Inc., Camp Hill, PA (US)

(72) Inventor: Mark C. Dick, New Cumberland, PA (US)

(73) Assignee: Lane Enterprises, Inc., Camp Hill, PA (US)

( * ) Notice: Subject to any disclaimer, the term of this patent is extended or adjusted under 35 U.S.C. 154(b) by 0 days.

(21) Appl. No.: 13/757,344

(22) Filed: Feb. 1, 2013

(51) Int. Cl.
*F16L 21/00* (2006.01)
*F16L 21/06* (2006.01)

(52) U.S. Cl.
CPC .............. *F16L 21/06* (2013.01); *Y10S 285/903* (2013.01)
USPC .......................................... 285/419; 285/903

(58) Field of Classification Search
USPC ........................................ 285/903, 419, 373
See application file for complete search history.

(56) References Cited

U.S. PATENT DOCUMENTS

| | | | |
|---|---|---|---|
| 1,227,187 A | | 5/1917 | Olcott |
| 1,313,667 A | * | 8/1919 | Benz ............................. 285/903 |
| 3,711,632 A | * | 1/1973 | Ghirardi ....................... 285/419 |
| 3,711,633 A | * | 1/1973 | Ghirardi et al. ............... 285/903 |
| 4,149,740 A | | 4/1979 | Hall |
| 4,168,091 A | * | 9/1979 | Boomgarden et al. ........ 285/419 |
| 4,273,367 A | * | 6/1981 | Keeney et al. ................ 285/419 |
| 4,443,031 A | * | 4/1984 | Borsh et al. .................... 285/419 |
| 4,557,510 A | | 12/1985 | Overmyer |
| 4,647,074 A | * | 3/1987 | Pate et al. ...................... 285/903 |
| 4,795,197 A | * | 1/1989 | Kaminski et al. ............. 285/903 |
| 4,797,512 A | * | 1/1989 | Kumagai et al. .............. 285/903 |
| 4,829,145 A | * | 5/1989 | Mitchell et al. ............... 285/903 |
| 4,854,665 A | | 8/1989 | Gagnon |
| 4,919,462 A | * | 4/1990 | Matsui et al. ................. 285/903 |
| 4,986,575 A | | 1/1991 | Braun |
| 5,015,013 A | * | 5/1991 | Nadin ........................... 285/419 |
| 5,072,972 A | | 12/1991 | Justice |
| 5,277,459 A | * | 1/1994 | Braun et al. ................... 285/419 |
| 6,398,270 B1 | * | 6/2002 | Fukui et al. ................... 285/373 |
| 6,899,359 B2 | | 5/2005 | Presby |
| 7,240,930 B2 | * | 7/2007 | Stravitz ......................... 285/419 |
| 7,581,564 B2 | * | 9/2009 | Tanaka et al. ................. 285/903 |
| 7,690,691 B2 | | 4/2010 | Kurdziel |

FOREIGN PATENT DOCUMENTS

| | | |
|---|---|---|
| JP | 09166255 A | 6/1997 |
| JP | 11351475 A | 12/1999 |
| JP | 200125483 A | 9/2001 |
| JP | 2002173973 A | 6/2002 |

* cited by examiner

*Primary Examiner* — David E Bochna
(74) *Attorney, Agent, or Firm* — Hooker & Habib, P.C.

(57) ABSTRACT

A coupler for coupling adjacent end portions of corrugated plastic pipe includes first and second arcuate members that cooperate with each other to surround and interfit with the corrugations of the plastic pipe. A stop member on one of the members enables the other member to be properly positioned over the other member when forming the coupler. Circumferentially aligned and spaced-apart attachment members resist relative movement of the two coupling members when backfilling the coupler and the pipes coupled by the coupler.

31 Claims, 4 Drawing Sheets

TWO-PIECE SPLIT COUPLER FOR COUPLING LARGE-DIAMETER PLASTIC CORRUGATED PIPE

FIELD OF THE DISCLOSURE

The disclosure relates to large-diameter plastic corrugated pipe, and in particular, to a pipe coupler for coupling adjacent end portions of large-diameter plastic corrugated pipe.

BACKGROUND OF THE DISCLOSURE

Large-diameter plastic corrugated pipe used in routing stormwater runoff is typically 24 inches to 60 inches in diameter. The pipe is extruded with annular, circular corrugations and valleys having a standardized geometry, the corrugations spaced at a constant pitch along the length of the pipe.

Adjoining end portions of adjacent lengths of pipe are conventionally coupled together using either "clam-shell" type couplers or "two-piece" couplers. The coupler is wrapped around the end portions of the two pipes, fits in the outer corrugations of the two pipes, and is then tightened to couple the ends of the pipe together. Backfill is applied to cover the coupler and joint and complete the installation.

Clam-shell couplers, however, are expensive, available in limited sizes and widths, and can be difficult to handle and install in the field.

Two-piece couplers, on the other hand, can be difficult to install and are available in limited sizes and widths. Two-piece couplers have coupler pieces that must overlap to align connecting member or holes. Such alignment is difficult in the field.

Thus there is a need for an improved pipe coupler for coupling the pipe ends of large diameter plastic corrugated pipe that is relatively inexpensive, can accommodate a variety of sizes and widths of pipe, and is relatively easy to install in the field.

SUMMARY OF THE DISCLOSURE

Disclosed is an improved two-piece coupler for coupling the pipe ends of large-diameter plastic corrugated pipe. The improved two-piece coupler is inexpensive to manufacture, can be easily made for many different sizes and widths of pipe, and is relatively quick and easy to install in the field.

Embodiments of the disclosed coupler can be used to couple adjacent end portions of cylindrical members such as pipes in which each cylindrical member has a corrugated outer surface with circular corrugations and valleys.

The coupler includes a first coupling member and a second coupling member, the first and second coupling members separate members not otherwise attached to one another.

Each of the first and second coupling members include an arcuate body extending along an axis, the axis defining a circumferential direction around the axis, the body having a a first end and a second end circumferentially spaced from the first end, with a gap between the ends. A number of circular corrugations and valleys extend around the axis of the body from the first end to the second end.

The second coupling member is configured to be placed over the gap of the first coupling member and overlap the first and second ends of the first coupling member and interfit with the corrugations and valleys of the first coupling member and the corrugations and valleys of the end portions of the cylindrical members received in the first coupling member and thereby cooperate with the first coupling member in completely surrounding the end portions of the cylindrical members.

The inner surfaces of the first and second coupling members are preferably radially sized to form an interference fit with the outer surfaces of the cylindrical members to assure a tight fit between the coupling members and the cylindrical members. In other possible embodiments the coupling members can be sized to not form an interference fit with the cylindrical members.

In possible embodiments the first coupling member includes a stop member on an outer surface of the body of the first coupling member. The stop member enables the second coupling member to be properly positioned over the first coupling member and overlap the gap of the first coupling member. The second coupling member may include a handle that enables a user to interfit the second coupling member with the first coupling member while the second coupling member is supported against the stop member.

Preferably, a first connection member is on the outside of the body of the first coupling member, and a second connection member is on the body of the first coupling member or on the outside of the body of the second coupling member. When the two coupling members are interfitted together to couple the end portions of the cylindrical members, the connection members are circumferentially spaced from one another but are axially aligned with one another to enable a cable tie, bolt, or other connecter member to connect the two connection members and resist relative motion of the attachment members away from each other during backfill of the trench containing the coupler and coupled end portions.

The bodies of the first and second coupling members can be each formed from extruded plastic. The same or similar extruder can be used that extrudes corrugated plastic pipe to be coupled b the coupler.

Other objects and features will become apparent as the description proceeds, especially when taken in conjunction with the accompanying drawing sheets illustrating one or more illustrative embodiments.

DETAILED DESCRIPTION

FIGS. 1-5 illustrate a two-piece pipe coupler 10. The illustrated pipe coupler 10 is designed to receive within it and couple the adjacent pipe ends of plastic corrugated pipe having a standardized configuration of annular, circular corrugations and valleys spaced at a constant pitch along the length of the pipe.

Figure 1:
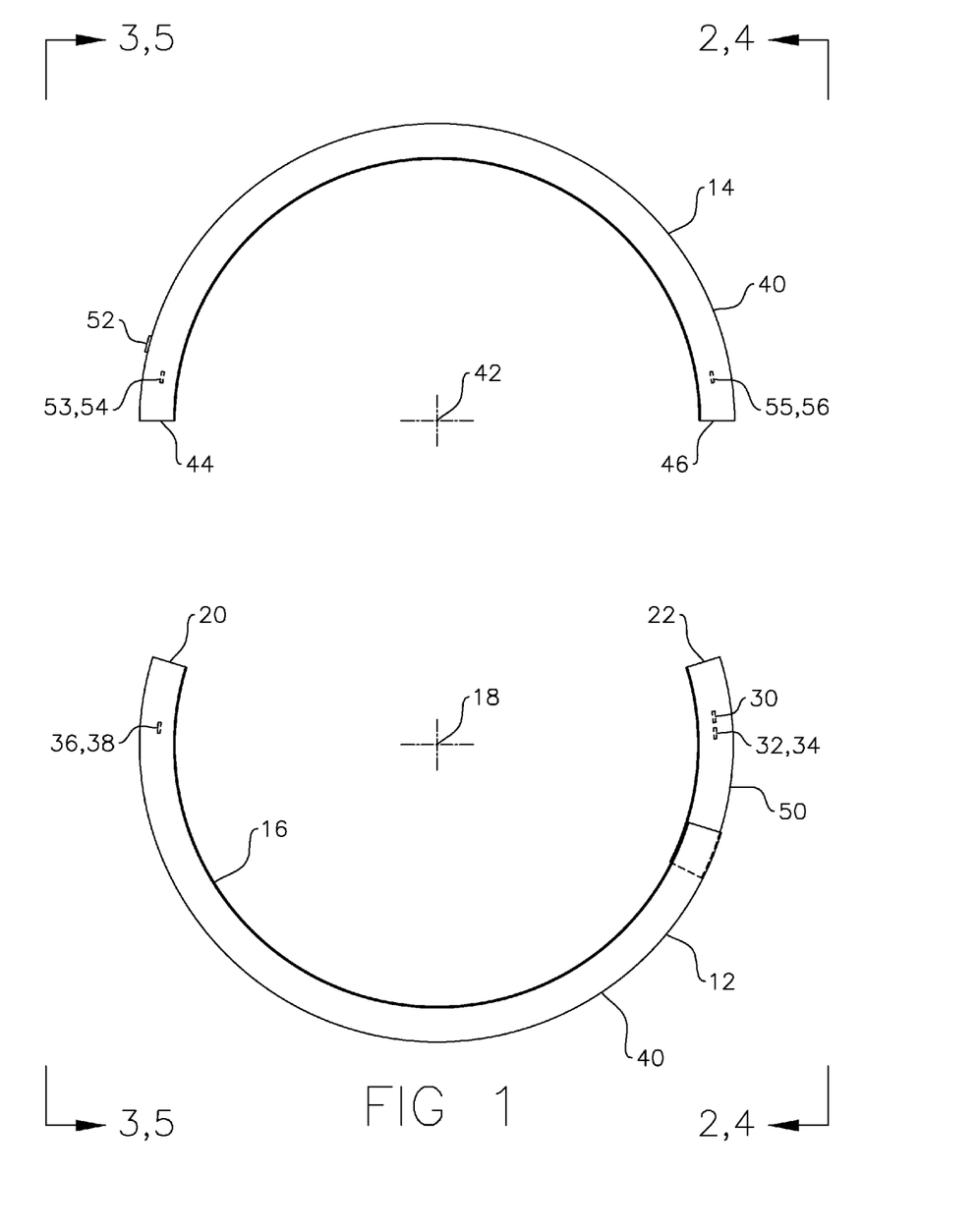
FIG. 1 is a front view of a two-piece split pipe coupler, the two pieces being separated.
Figure 2:
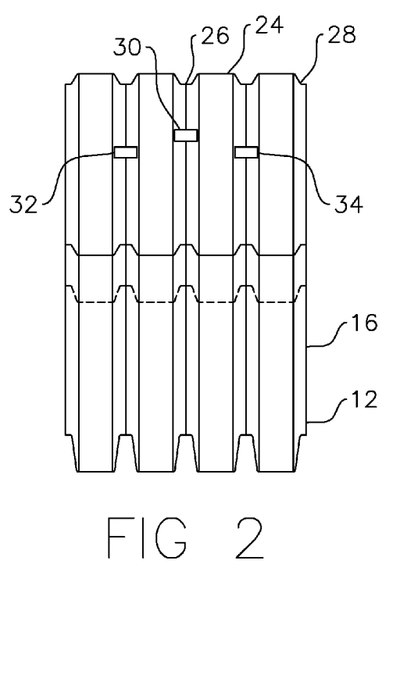
FIG. 2 is a right-side view taken along line 2,4 of FIG. 1 of the larger coupler half.
Figure 3:
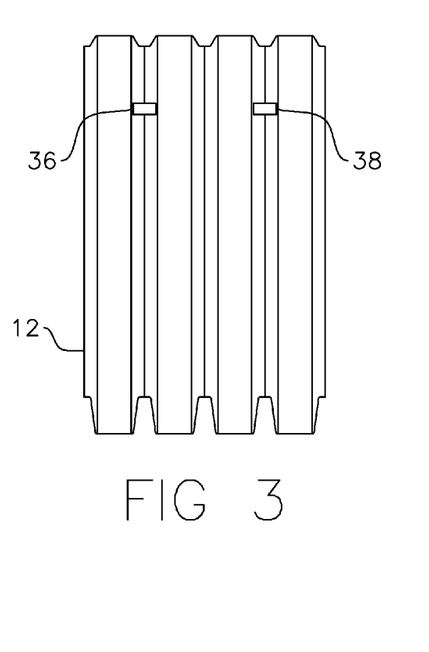
FIG. 3 is a left-side view taken along line 3, 5 of FIG. 1 of the larger coupler half.
Figure 4:
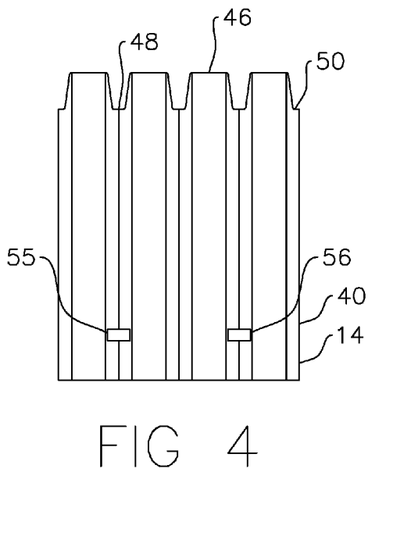
FIG. 4 is a right-side view taken along line 2,4 of FIG. 1 of the smaller coupler half.
Figure 5:
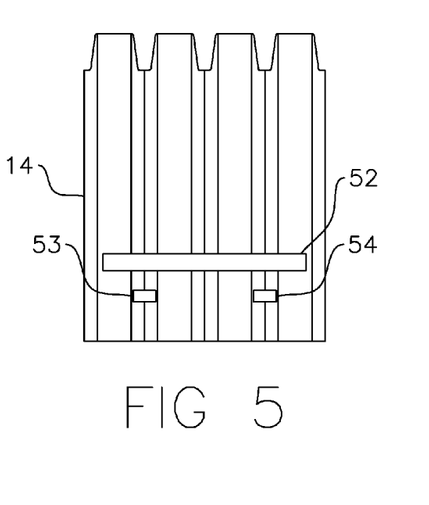
FIG. 5 is a left-side view taken along line 3,5 of FIG. 1 of the smaller coupler half.

The two-piece pipe coupler 10 includes a first, larger coupling member or coupler half 12 and a second, smaller coupling member or coupler half 14. The two coupler halves 12, 14 surround and couple the pipe ends as will be described in more detail below.

The first coupler half 12 is a generally cylindrical member having a cylindrical body 16 that extends along and is axially symmetric about an axis 18 (the axis 18 is perpendicular to the drawing sheet in FIG. 1). The cylindrical body 16 is fabricated from extruded plastic, such as extruded HDPE (high density polyethylene) or other moldable plastic. The body 16 is an arcuate member extending substantially more than 180 degrees about the axis 18 from a first circumferential end 20 to the opposite second circumferential end 22. The illustrated body 16 extends about 200 degrees between the ends 20, 22 about the axis 18. The body 16 has four annular, circular crowns or corrugations 24, a set of annular, circular grooves or valleys 26 between the corrugations 24, and annular, circular half valleys 28 on adjacent sides of the body 16. In other possible embodiments the half valleys 28 are eliminated.

The corrugations 24 and the valleys 26, 28 are shaped to conform with and interfit with the corrugations and valleys of the pipes being coupled together. The inner radial dimensions of the corrugations 24 and the valleys 26, 28 are sized to be slightly smaller than the outer radial dimensions of the corresponding corrugations and valleys of the plastic pipe to be coupled by the coupler 10. The outer radial dimensions of the corrugations 24 and the valleys 26, 28 of the coupler body 16 are sized to provide sufficient mechanical strength for coupling the pipes while still providing sufficient flexibility of the coupler body 16 to enable elastic deformation of the body 16 increasing the gap between the body ends 20, 22 when receiving the pipe ends into the body 16.

The coupler half 12 further includes a sets of lugs that assist in assembling the coupler 10 and keeping the assembled coupler 10 together as will be discussed in greater detail below. The coupler half 12 includes a stop lug 30 and a pair of connection lugs 32, 34 adjacent the body end 20 and a pair of connection lugs 36, 38 adjacent the body end 22. Each lug 30-38 is formed from a rectangular plastic plate that is welded to the body 16 and extends across the valley defined between a respective pair of corrugations.

The stop lug 30 extends across the center valley 26 between the center two corrugations 24 and is spaced a predetermined distance from the body end 20. The stop lug 30 acts as a stop or stop member that helps locate the second coupler half 14 on the first coupler half 12. The connector lugs 32, 34 are located on opposite sides of the stop lug 30 and are spaced further from the body end 20 than is the stop lug 30.

The connector lugs 36, 38 are axially aligned with the lugs 34, 32 respectively and are adjacent to and spaced from the body end 20 the same distance the lugs 32, 34 are spaced from the body end 22.

The coupler half 14 is a generally cylindrical member having a cylindrical body 40 that extends along and is axially symmetric about an axis 42 (the axis 42 perpendicular to the drawing sheet in FIG. 1). The body 40 is otherwise identical to the body 16 except that the body 40 has a lesser arcuate length between ends than does the body 16. The illustrated body 40 extends about 180 degrees about the axis 42 between a first body end 44 and a circumferentially opposite second body end 46. The body 40 is able to span the gap between the ends 22, 24 of the body 16 with some overlap of the end portions of the body 16 when the coupler 10 is assembled.

The body 40 has four annular, circular crowns or corrugations 46, a set of annular, circular grooves or valleys 48 between the corrugations 46, and annular, circular half valleys 50 on adjacent sides of the body 40. In other embodiments of the invention the half valleys 50 are eliminated.

In yet other possible embodiments, the second coupler half could have more corrugations and valleys than does the first coupler half.

The coupler half 14 further includes a handle 52 and a set of connector lugs 53, 54, 55, 56 that assist in assembling the coupler 10 and keeping the assembled coupler 10 together as will be discussed in greater detail below.

The handle 52 is adjacent to and relatively closely spaced from the body end 44. The handle 52 is formed from a rectangular plate welded to the body 40. The handle 52 is welded to the tops of the corrugations 46 and extends essentially the full width of the body 40.

Each lug 53-56 is formed from a rectangular plastic plate that is welded to the body 16 and extends across the valley defined between a respective pair of corrugations. The connection lugs 53, 54 are adjacent to and spaced a predetermined distance from the body end 44 and between the body end 44 and the handle 52. The connection lugs 55, 56 are adjacent to and spaced a predetermined distance from the body end 46. The connection lugs 53, 54, 55, 56 are axially aligned with respective connection lugs 36, 38, 40, 42 When the coupler 10 is assembled as will be described in greater detail below.

Figure 6:
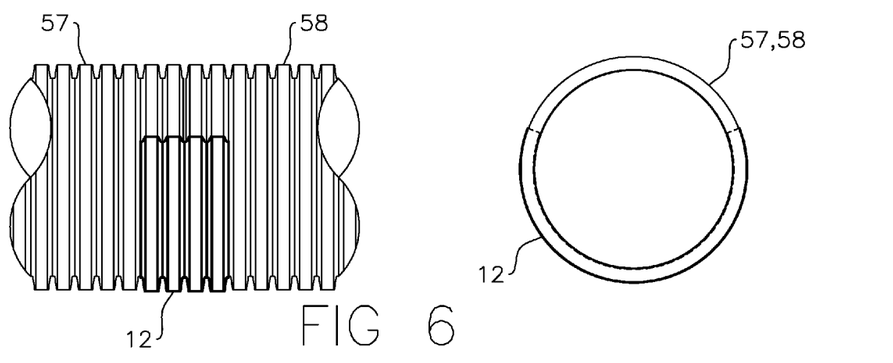
FIGS. 6-8 illustrate the steps in installing the pipe coupler to join the adjacent pipe ends of two large-diameter plastic corrugated pipes.
Figure 7:
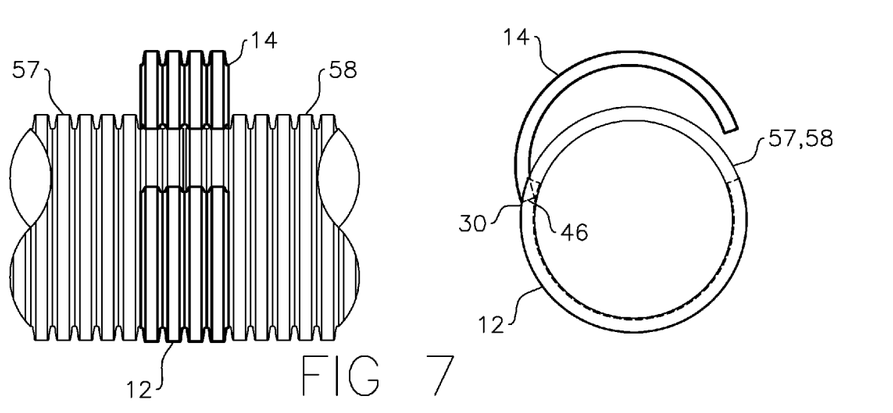
Figure 8:
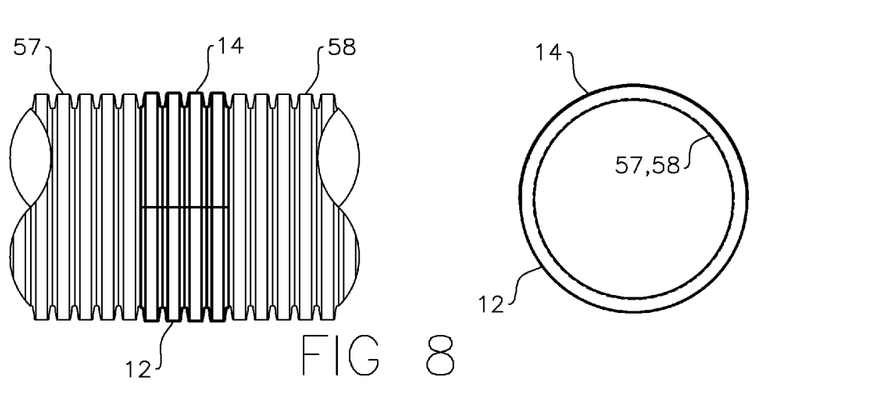

FIGS. 6-8 illustrate the steps in installing the pipe coupler 10 to join the immediately adjacent pipe ends of two large-diameter plastic corrugated pipes 57, 58.

The larger coupler half 12 is placed into a trench (not shown) that will receive the pipes 57, 58, with the gap defined between the half ends 20, 22 facing up. The two pieces of pipe 57, 58 are then placed into the trench, with the immediately adjacent end portions of the pipes 57, 58 received into the coupler half 12. See FIG. 6. The body 16 elastically deforms to receive the end portions of the pipes 57, 58 through the gap and into the first coupler half 12. Two corrugations of each of the pipes 57, 58 are closely received into two corresponding corrugations 24 of the coupler half 12. The coupler half 12 forms an interference fit with the pipes 57, 58 assuring a tight fit between the coupler half 12 and the pipes 57, 58.

The smaller coupler half 14 is placed on top of the pipes 57, 58 and is aligned longitudinally with the lower coupler half 12. See FIG. 7. The end 46 of the lower coupler half 14 is placed against the stop 30 of the lower coupler half 12, thereby assuring that the coupler 10 will be assembled with the coupler half 14 substantially centered over the gap in the coupler half 12.

A cable tie (not shown) is placed around and between the lug 32 of the larger coupler half 12 and the lug 55 of the smaller coupler half 14, and another cable tie (not shown) is placed around and between the lug 34 of the larger coupler half 12 and the lug 56 of the smaller coupler half 14. The cable ties can be loosely tightened to temporarily hold smaller coupler half 14 in alignment with the larger coupler half 12 during assembly.

The handle 52 of the coupler half 14 is then pulled down towards the end 22 of the coupler half 12, until the upper portions of the corrugations of the pipes 57, 58 and the corrugations of the overlapping portions of the coupler half 12 are closely received in the corresponding corrugations of the coupler half 14. See FIG. 8 which illustrates the smaller coupler half 14 in a coupling position with respect to the larger coupler half 12. The smaller coupler half 14 forms an interference fit with the pipes 57, 58 and the overlapping portions of the larger coupler half 12, assuring a tight fit between the various components.

Additional cable ties (not shown) are then attached to and extend along the portions of the respective valleys extending between the axially aligned pairs of connector lugs 36, 38 and connector lugs 53, 54. All the cable ties are then cinched tight to assure that the coupler halves 12, 14 will remain in place as intended while the trench containing the coupler 10 and pipes 57, 58 is backfilled to complete installation.

If desired, additional connection lugs can be located on the larger coupler halves. The handle 52 can also be used as a connection member or connection lug.

The illustrated coupler halves 12, 14 are manufactured by extrusion using the same or identical extruder used in manufacturing the pipes 57, 58. The extruder extrudes lengths of pipe that are each otherwise identical to the standard pipe 57, 58 except that the inner radial dimensions of the extruded pipe are slightly larger than the standard pipe. The pipe is then cut in half lengthwise to form two 180-degree semicircular pipe lengths. The semicircular pipe lengths are cut to axial lengths with the desired number of corrugations for the coupler, thereby forming the bodies 40 of the smaller coupler halves 14.

The illustrated coupler 10 engages and interfits with two corrugations of each pipe 57, 58; other coupler embodiments could interfit with a fewer or greater number of corrugations. One coupler half could interfit with a different number of corrugations than the other coupler half.

Other semicircular pipe lengths are cut into multiple arc-shaped lengths of pipe, and these lengths are then cut to the desired axial lengths to form arcuate "ears" that are attached to the smaller coupler halves to form the larger coupler halves. For example, FIG. 1 shows that the larger coupler half 12 is fabricated by welding an ear 50 to a body 40.

Figure 9:
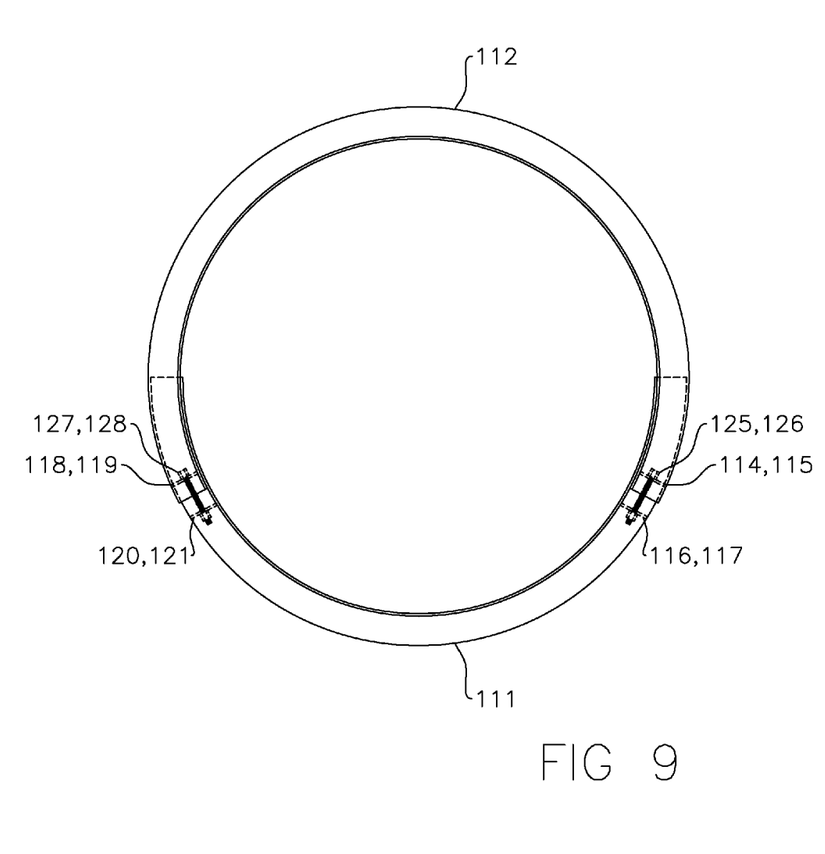
FIG. 9 is a front view of an assembled second embodiment pipe coupler.

In yet other possible embodiments, bolted connections between coupler halves replace the cable tie connections. FIG. 9 illustrates an assembled coupler 110 similar to the coupler 10 and having a smaller coupler half 111 and a larger coupler half 112 (for clarity, the pipes are omitted). The coupler half 112 includes connector lugs 114, 115, 118, 119 similar to the lugs on the coupler half 14. The coupler half 111 includes connector lugs 116, 117, 120, 121 similar to the lugs on the coupler half 12. Each of the lugs 114-121 is formed with a radially open-ended slot that enables a bolt 125, 126, 127, 128 or other clip or fastener to extend between pairs of lugs and mechanically connect the lugs on the coupler half 111 with the lugs on the coupler half 112. Close alignment of the lugs is not required, simplifying assembly. In other embodiments the lugs may include through holes rather than slots, the holes large enough to accept some misalignment while still permitting a bolt or fastener to pass through the holes for mechanically connecting the coupler halves together.

The illustrated coupler 10 is shown coupling the adjacent ends of large-diameter corrugated plastic pipe. The disclosed coupler is not limited to joining pipe ends; it can be used to join an end of a tee or elbow pipe coupling or the like. The disclosed coupler is not limited to use only with pipe; the coupler can join solid cylindrical members having the same outer profile of corrugations and valleys. The disclosed coupler can also be used to couple adjacent ends of members having a diameter less than 24 inches or greater than 60 inches.

While one or more embodiments have been described in detail, it is understood that this is capable of modification and that the disclosure is not limited to the precise details set forth but includes such changes and alterations as fall within the purview of the following claims.

What is claimed as the invention is:

1. A coupler for coupling adjacent cylindrical end portions of a first pipe and a second pipe each cylindrical end portion having a corrugated outer surface with circular corrugations and valleys, the coupler comprising:

a first coupling member and a second coupling member, the first and second coupling members being separate members not otherwise attached to one another;

each of the first and second coupling members comprising an arcuate body extending in a first direction along an axis and curving in a second, circumferential direction around the axis, the body comprising a first end, a second end circumferentially spaced from the first end, a first side, a second side axially spaced from the first side, a radially inner surface and a radially outer surface, the first and second ends being separated by a circumferential gap therebetween, and a plurality of circular corrugations and valleys alternating with one another from the first side of the body to the second side of the body, each corrugation and valley extending continuously without interruption around the axis of the body from the first end to the second end;

the first coupling member curving in the circumferential direction more than 180 degrees from the first end to the second end of the first coupling member whereby the circumferential gap of the first coupling member extends less than 180 degrees around the axis of the first coupling member;

the first coupling member comprising a stop member being integral with the body of the first coupling member and being disposed on the outer surface of the body of the first coupling member, the stop member being circumferentially spaced from the first end of said body;

the first coupling member being capable of receiving the cylindrical end portions through the gap in the first coupling member and interfitting with the corrugations and valleys of the cylindrical end portions received in the first coupling member when coupling the cylindrical end portions;

the second coupling member being capable of being placed on the first coupling member in a coupling position of the second coupling member with respect to the first coupling member wherein the body of second coupling member spans the gap of the first coupling member and overlaps the first and second ends of the body of the first coupling member with the overlapping corrugations and valleys of the first and second coupling members interfitting each other whereby the first and second coupling members completely surround the cylindrical end portions when coupling the cylindrical end portions; and the stop member being configured and disposed to be adjacent to and capable of supporting the first end of the second coupling member when placing the second coupling member in the coupling position on the first coupling member, the second coupling member positionable to span across the gap of the first coupling member when supported against the stop member; and the stop member being in the circumferential path of movement of the second coupling member around the first coupling member when the second coupling member is in the coupling position on the first coupling member whereby the stop member resists further circumferential movement of the second coupling member away from the coupling position towards the stop member.

2. The coupler of claim 1 wherein the stop member extends between a pair of the corrugations of the body of the first coupling member.

3. The coupler of claim 2 wherein the stop member is a plate.

4. The coupler of claim 1 wherein the body of the first coupling member is formed from a first arcuate body member and a second arcuate body member rigidly attached to the first body member, the first body member extending from the first end of the body and the second body member extending from the first body member to the second end of the body.

5. The coupler of claim 1 wherein the body of the second coupling member extends in the circumferential direction not greater than 180 degrees about the axis of the second coupling member.

6. The coupler of claim 1 wherein the second coupling member comprises a handle attached to the outer surface of the body of the second coupling member.

7. The coupler of claim 1 wherein the body of the first coupling member comprises a first end portion at the first end of the body and a second end portion at the second end of the body, the body of the second coupling member overlapping the first and second end portions of the first coupling member when the stop member is resisting movement of the second coupling member away from the coupling position.

8. The coupler of claim 1 wherein each of the first and second coupling members comprises first and second connection members disposed on the outer surface of the body of the coupling member; and
the first and second connection members of the second coupling member are axially aligned with respective first and connection members of the first coupling member when the second coupling member is in the coupling position on the first coupling member.

9. The coupler of claim 8 wherein the stop member is circumferentially disposed nearer to the first end of the first coupling member than are the first and second connection members of the first coupling member.

10. The coupler of claim 1 wherein the bodies of the first and second coupling members comprise plastic.

11. The coupler of claim 1 wherein the body inner surfaces of the first and second coupling members are radially sized to form interference fits with outer surfaces of the cylindrical end portions when coupling the cylindrical end portions.

12. The coupler of claim 1 in combination with the first pipe and the second pipe, each pipe comprising the cylindrical end portion and a second portion adjacent the cylindrical end portion;
each cylindrical end portion comprising a corrugated outer surface with corrugations and valleys extending around an axis;
the cylindrical end portions of the first and second pipes being next to one another and coaxial with one another;
the coupler coupling together the adjacent cylindrical end portions, the first coupling member partially surrounding both cylindrical end portions, the corrugations and valleys of the first coupling member interfitting with the corrugations and valleys of both cylindrical end portions, the second coupling member being over the first coupling member in the coupling position of the second coupling member wherein the second coupling member partially overlaps the first coupling member and partially overlaps both cylindrical end portions, overlapping corrugations and valleys of the second coupling member and the cylindrical end portions interfitting with one another whereby the second coupling member cooperates with the first coupling member in completely surrounding both cylindrical end portions; and
the second portions of the pipes being outside of the coupler.

13. The coupler of claim 1 wherein the first and second sides of each of the first and second coupling members are spaced apart by the width of the coupling member, the widths of the first and second coupling members being substantially equal to one another.

14. The coupler of claim 1 wherein the first coupling member comprises a second stop member integral with the body of the second stop member, the second stop member being on the outer surface of the body of the first coupling member, the second stop member being circumferentially spaced from the second end of said body;
the second end of the second coupling member when the second coupling member is in the operating position on the first coupling member being adjacent to the second stop member; and
the second stop member being configured and disposed to be in the circumferential path of movement of the second coupling member around the first coupling member when the second coupling member is in the coupling position whereby the second stop member resists further circumferential movement of the second coupling member away from the coupling position towards the second stop member.

15. A coupler for coupling adjacent cylindrical end portions of a first pipe and a second pipe, each cylindrical end portion having a corrugated outer surface with circular corrugations and valleys, the coupler comprising:
a first coupling member and a second coupling member, the first and second coupling members being separate members not otherwise attached to one another;
the first coupling member comprising an arcuate body extending in an axial direction along a first axis and curving in a circumferential direction around the first axis, the body comprising a radially outer surface, first and second connection members on the outer surface of the body and integral with the body, the body further comprising a first end and a second end circumferentially spaced from the first end, the first and second ends separated by a circumferential gap therebetween, a first side and a second side axially spaced from the first side, a plurality of circular corrugations and valleys alternating with one another from the first side of the body to the second side of the body, each corrugation and valley extending without interruption around the axis of the body from the first end to the second end, and the first connection member being circumferentially spaced away from the first end of the body and the second connection member being circumferentially spaced from the second end of the body;
the second coupling member comprising an arcuate body extending in an axial direction along a second axis and curving in a circumferential direction around the second axis, the body comprising a first end and a second end circumferentially spaced an angular distance from the first end, the first and second ends separated by a circumferential gap therebetween, a first side and a second side axially spaced from the first side, and a plurality of circular corrugations and valleys alternating with one another from the first side of the body to the second side of the body and extending without interruption around the axis of the body from the first end to the second end;
the first coupling member being configured to receive the cylindrical end portions through the gap in the first coupling member and interfit with the corrugations and valleys of the cylindrical end portions received in the first coupling member when coupling the cylindrical end portions;

the second coupling member being configured to be placed on the first coupling member over the gap of the first coupling member and overlap the first and second ends of the first coupling member and interfit with the corrugations and valleys of the first coupling member and the corrugations and valleys of the cylindrical end portions received in the first coupling member when coupling the cylindrical end portions and thereby cooperating with the first coupling member in completely surrounding the cylindrical end portions; and the first and second connection members being circumferentially spaced from each other an angular distance greater than the angular distance of the second coupling member whereby the first and second connection members are adjacent respective ends of the second coupling member when the second coupling member is placed on the first coupling member and interfitted with the first coupling member.

16. The coupler of claim 15 wherein both first and second connection members extend across one of the valleys of the first coupling member.

17. The coupler of claim 16 wherein each of the first and second connection members is a flat plate extending across the one valley.

18. The coupler of claim 15 wherein the body of the second coupling member comprises a radially outer surface, the second coupling member including third and fourth connection members integral with said body, the third and fourth connection members being on the outer surface of the body of the second coupling member.

19. The coupler of claim 15 wherein the body of the second coupling member comprises a radially outer surface, the second coupling member comprising a handle integral with the said body, the handle being on the outer surface of the body of the second coupling member.

20. The coupler of claim 15 wherein the first and second coupling members form an interference fit with the cylindrical end portions when coupling the cylindrical end portions.

21. The coupler of claim 15 in combination with the first pipe and the second pipe, each pipe comprising the cylindrical end portion and a second portion adjacent the cylindrical end portion;

each cylindrical end portion comprising a corrugated outer surface with corrugations and valleys extending around an axis;

the cylindrical end portions of the first and second pipes being adjacent to one another and coaxial with one another;

the coupler coupling together the adjacent cylindrical end portions of both pipes, the first coupling member partially surrounding both cylindrical end portions, the corrugations and valleys of the first coupling member interfitting with the corrugations and valleys of both cylindrical end portions, the second coupling member being on the first coupling member over the gap of the first coupling member wherein the second coupling member partially overlaps the first coupling member and partially overlaps both cylindrical end portions, overlapping corrugations and valleys of the second coupling member and the cylindrical end portions interfitting with one another whereby the second coupling member cooperates with the first coupling member in completely surrounding both cylindrical end portions; and the second portions of the pipes being outside of the coupler.

22. A coupler for coupling adjacent cylindrical end portions of a first pipe and a second pipe, each cylindrical end portion having a corrugated outer surface with circular corrugations and valleys, the coupler comprising:

a first coupling member and a second coupling member, the first and second coupling members being separate members not otherwise attached to one another;

the first and second coupling members each comprising an arcuate body extending in an axial direction along an axis and curving in a circumferential direction around the axis, a radially outer surface and a radially inner surface, an attachment member on the outer surface of the body integral with the body, the attachment member defining a slot or opening extending along a fastener axis, the body comprising a first end and a second end circumferentially spaced from the first end, a first side and an axially opposite second side, the first and second ends separated by a circumferential gap therebetween, a plurality of circular corrugations and valleys alternating with one another from the first side to the second side, each corrugation and valley extending around the axis of the body without interruption from the first end to the second end;

the attachment member of the first coupling member being circumferentially spaced away from the ends of the first coupling member, the attachment member of the second coupling member being adjacent one of the ends of the second coupling member;

the first coupling member being configured to receive the cylindrical end portions through the gap in the first coupling member and interfit with the corrugations and valleys of the cylindrical end portions received in the first coupling member when coupling the cylindrical end portions;

the body of the second coupling member being configured to be placed over the gap of the first coupling member and overlap the first and second ends of the body of the first coupling member with that portion of the inner surface of the second coupling member not over the gap being disposed against the outer surface of the first coupling member and interfitting with the corrugations and valleys of the first coupling member and thereby cooperating with the first coupling member in completely surrounding the cylindrical end portions when coupling the cylindrical end portions; and when the second coupling member is interfitted with the first coupling member the attachment members are adjacent to one another and the slots or holes of the attachment members are substantially coaxial with each other whereby the slots or holes of the attachment members are capable of cooperatively receiving a connecting member to resist relative movement of the attachment members away from each other.

23. The coupler of claim 22 wherein the connecting member is a cable tie that connects the attachment members.

24. The coupler of claim 22 wherein the connecting member is a bolt that connects the attachment members.

25. The coupler of claim 22 wherein the first and second coupling members form an interference fit with the cylindrical end portions independently of any connection of the attachment members when coupling the cylindrical end portions.

26. The coupler of claim 22 wherein the bodies of the first and second coupling members each comprise extruded plastic.

27. The coupler assembly of claim 22 wherein the attachment member of each of the first and second coupling members is one of a plurality of like attachment members on the outer surface of the body of the coupling member.

28. The coupler of claim 22 in combination with the first pipe and the second pipe, each pipe comprising the cylindrical end portion and a second portion adjacent the cylindrical end portion;

each cylindrical end portion comprising a corrugated outer surface with corrugations and valleys extending around an axis;

the cylindrical end portions of the first and second pipes being adjacent to one another and coaxial with one another;

the coupler coupling together both cylindrical end portions, the first coupling member partially surrounding both cylindrical end portions, the corrugations and valleys of the first coupling member interfitting with the corrugations and valleys of both cylindrical end portions, the second coupling member being on the first coupling member over the gap of the first coupling member wherein the second coupling member partially overlaps the first coupling member and partially overlaps both cylindrical end portions, overlapping corrugations and valleys of the second coupling member and both cylindrical end portions interfitting with one another whereby the second coupling member cooperates with the first coupling member in completely surrounding both cylindrical end portions; and the second portions of the first and second pipes each being outside of the coupler.

29. A coupler for coupling adjacent cylindrical end portions of a first pipe and a second pipe, each cylindrical end portion having a corrugated outer surface with circular corrugations and valleys, the coupler comprising:

a first coupling member and a second coupling member, the first and second coupling members being separate members not otherwise attached to one another;

each of the first and second coupling members comprising an arcuate body extending in a first direction along an axis and curving in a second, circumferential direction around the axis, the body comprising a first end, a second end circumferentially spaced from the first end, the first and second ends separated by a circumferential gap therebetween, a first side and an axially opposite second side, and a plurality of circular corrugations and valleys alternating with one another from the first side to the second side, each corrugation and valley extending without interruption around the axis of the body from the first end to the second end;

the body of the first coupling member comprising a first end portion at the first end of the body and a second end portion at the second end of the body;

the first coupling member comprising a stop member, a first connection member, and a second connection member, the stop member and the first and second connection members each being integral with the body of the first coupling member and on an outer surface of the body of the first coupling member, the stop member circumferentially spaced from the first end of said body, the first connection member adjacent the first end portion and the second connection member adjacent the second end portion;

the first coupling member being configured to receive the end portions of the cylindrical end portions through the gap in the first coupling member and interfit with the corrugations and valleys of the cylindrical end portions received in the first coupling member when coupling the cylindrical end portions;

the second coupling member being configured to be placed on the body of the first coupling member between the first and second connection members with the body of the second coupling member over the gap of the first coupling member and overlapping the first and second end portions of the first coupling member and interfitting with the corrugations and valleys of the first coupling member and corrugations and valleys of the cylindrical end portions received in the first coupling member when coupling the cylindrical end portions and thereby cooperating with the first coupling member in completely surrounding the cylindrical end portions; and the stop member being configured and disposed to support the first end of the second coupling member when placing the second coupling member on the first coupling member, the second coupling member positionable to span across the gap of the first coupling member when supported against the stop member.

30. The coupler of claim 29 in which the second coupling member comprises first and second connection members disposed on an outer surface of the body of the second coupling member, the first and second connection members of the second coupling member being axially aligned with respective first and second connection members of the first coupling member when the coupling members are coupling the cylindrical end portions.

31. The coupler of claim 29 in combination with the first pipe and the second pipe, each pipe comprising the cylindrical end portion and a second portion adjacent the cylindrical end portion;

each cylindrical end portion comprising a corrugated outer surface with corrugations and valleys extending around an axis;

the cylindrical end portions of the first and second pipes being adjacent to one another and coaxial with one another;

the coupler coupling together the adjacent cylindrical end portions of both pipes, the first coupling member partially surrounding both cylindrical end portions, the corrugations and valleys of the first coupling member interfitting with the corrugations and valleys of both cylindrical end portions, the second coupling member being on the first coupling member over the gap of the first coupling member wherein the second coupling member partially overlaps the first coupling member and partially overlaps both cylindrical end portions, overlapping corrugations and valleys of the second coupling member and the cylindrical end portions interfitting with one another whereby the second coupling member cooperates with the first coupling member in completely surrounding both cylindrical end portions; and the second portions of the pipes being outside of the coupler.

* * * * *